United States Patent
Rajagopal et al.

(10) Patent No.: US 12,476,978 B2
(45) Date of Patent: Nov. 18, 2025

(54) MANAGEMENT OF COMPUTING SERVICES FOR APPLICATIONS COMPOSED OF SERVICE VIRTUAL COMPUTING COMPONENTS

(71) Applicant: Amazon Technologies, Inc., Seattle, WA (US)

(72) Inventors: Hari Ohm Prasath Rajagopal, Tracy, CA (US); Prashant Kumar Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 18/478,375

(22) Filed: Sep. 29, 2023

(65) Prior Publication Data

US 2025/0112929 A1    Apr. 3, 2025

(51) Int. Cl.
H04L 9/40    (2022.01)

(52) U.S. Cl.
CPC .......... H04L 63/105 (2013.01); H04L 63/083 (2013.01)

(58) Field of Classification Search
CPC ... H04L 63/105; H04L 63/083; G06F 9/5072; G06F 9/468
See application file for complete search history.

(56) References Cited

U.S. PATENT DOCUMENTS

| | | |
|---|---|---|
| 4,949,254 A | 8/1990 | Shorter |
| 5,283,888 A | 2/1994 | Dao et al. |
| 5,835,764 A | 11/1998 | Platt et al. |
| 5,970,488 A | 10/1999 | Crowe et al. |

(Continued)

FOREIGN PATENT DOCUMENTS

| | | |
|---|---|---|
| CA | 2975522 A1 | 8/2016 |
| CN | 1341238 A | 3/2002 |

(Continued)

OTHER PUBLICATIONS

International Search Report and Written Opinion received in PCT Application No. PCT/US2024/048187 as mailed Jan. 20, 2025 in 14 pages.

(Continued)

*Primary Examiner* — Sm A Rahman
(74) *Attorney, Agent, or Firm* — Knobbe, Martens, Olson & Bear, LLP

(57) ABSTRACT

Systems and methods are provided for managing computing services for an application comprising a plurality of virtual computing components executing on one or more host computing devices, wherein a service virtual computing component is to perform application functionality, and wherein a system computing component is to perform system functionality including management of the application virtual computing component; determining the service virtual computing component is to execute using a first access credential to provide a first computing service to the application virtual computing component, and the service virtual computing component is to execute using a second access credential to provide a second computing service to the system computing component, wherein the first access credential is assigned a different set of computing resource access permissions than the second access credential.

20 Claims, 6 Drawing Sheets

(56) References Cited

U.S. PATENT DOCUMENTS

| | | |
|---|---|---|
| 5,983,197 A | 11/1999 | Enta |
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,360,215 B2 | 4/2008 | Kraiss et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,640,574 B1 | 12/2009 | Kim et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,402,514 B1 | 3/2013 | Thompson et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,713,093 B1 | 4/2014 | Upadhyay et al. |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,763,091 B1 | 6/2014 | Singh et al. |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,266 B1 | 8/2014 | Qu et al. |
| 8,806,468 B2 | 8/2014 | Meijer et al. |
| 8,806,644 B1 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,949,457 B1 | 2/2015 | Theroux et al. |
| 8,966,495 B2 | 2/2015 | Kulkarni |
| 8,972,980 B2 | 3/2015 | Banga et al. |
| 8,990,807 B2 | 3/2015 | Wu et al. |
| 8,997,093 B2 | 3/2015 | Dimitrov |
| 9,002,871 B2 | 4/2015 | Bulkowski et al. |
| 9,021,501 B2 | 4/2015 | Li et al. |
| 9,026,658 B2 | 5/2015 | Xu et al. |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,104,477 B2 | 8/2015 | Kodialam et al. |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,130,900 B2 | 9/2015 | Tran |
| 9,141,410 B2 | 9/2015 | Leafe et al. |
| 9,146,764 B1 | 9/2015 | Wagner |
| 9,152,406 B2 | 10/2015 | De et al. |
| 9,154,955 B1 | 10/2015 | Bertz et al. |
| 9,164,754 B1 | 10/2015 | Pohlack |
| 9,176,871 B1 | 11/2015 | Serlet |
| 9,183,019 B2 | 11/2015 | Kruglick |
| 9,189,778 B1 | 11/2015 | Sh. Al-Rashidi |
| 9,195,520 B2 | 11/2015 | Turk |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,565,190 B1 | 2/2017 | Telvik et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |

(56) References Cited

U.S. PATENT DOCUMENTS

| | | |
|---|---|---|
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,799,017 B1 | 10/2017 | Vermeulen et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,496,547 B1 | 12/2019 | Naenko et al. |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 | 5/2020 | Wozniak |
| 10,678,522 B1 | 6/2020 | Yerramreddy et al. |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,732,951 B2 | 8/2020 | Jayanthi et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 10,956,244 B1 | 3/2021 | Cho |
| 11,010,188 B1 | 5/2021 | Brooker et al. |
| 11,016,815 B2 | 5/2021 | Wisniewski et al. |
| 11,044,198 B1 | 6/2021 | Ahn et al. |
| 11,082,333 B1 | 8/2021 | Lam et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,327,992 B1 | 5/2022 | Batsakis et al. |
| 11,354,169 B2 | 6/2022 | Marriner et al. |
| 11,360,793 B2 | 6/2022 | Wagner et al. |
| 11,392,497 B1 | 7/2022 | Brooker et al. |
| 11,461,124 B2 | 10/2022 | Wagner et al. |
| 11,467,890 B2 | 10/2022 | Wagner |
| 11,550,713 B1 | 1/2023 | Piwonka et al. |
| 11,561,811 B2 | 1/2023 | Wagner |
| 11,593,270 B1 | 2/2023 | Brooker et al. |
| 11,714,675 B2 | 8/2023 | Brooker et al. |
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |

(56) References Cited

U.S. PATENT DOCUMENTS

| | | |
|---|---|---|
| 2003/0071842 A1 | 4/2003 | King et al. |
| 2003/0084434 A1 | 5/2003 | Ren |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1 | 2/2006 | Chu et al. |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0282330 A1 | 12/2006 | Frank et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1 | 1/2009 | Grey et al. |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0169477 A1 | 7/2010 | Stienhans et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |

(56) References Cited

U.S. PATENT DOCUMENTS

| | | |
|---|---|---|
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1 | 5/2012 | Chung et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324052 A1 | 12/2012 | Paleja et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132283 A1 | 5/2013 | Hayhow et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0181998 A1 | 7/2013 | Malakapalli et al. |
| 2013/0185719 A1 | 7/2013 | Kar et al. |
| 2013/0185729 A1 | 7/2013 | Vasic et al. |
| 2013/0191847 A1 | 7/2013 | Sirota et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |

(56) References Cited

U.S. PATENT DOCUMENTS

| | | |
|---|---|---|
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0109092 A1* | 4/2014 | Jacobson ............ G06F 9/45533 718/1 |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1 | 9/2014 | Cheriton |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0025989 A1 | 1/2015 | Dunstan |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0206139 A1 | 7/2015 | Lea |
| 2015/0212818 A1 | 7/2015 | Gschwind et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1 | 9/2015 | Saladi et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0072781 A1 | 3/2016 | Zhang et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |

(56) References Cited

U.S. PATENT DOCUMENTS

| | | |
|---|---|---|
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0350124 A1 | 12/2016 | Gschwind et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1 | 6/2017 | Doerner et al. |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1 | 7/2017 | Biberman et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286187 A1 | 10/2017 | Chen et al. |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0322824 A1 | 11/2017 | Reuther et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0113793 A1 | 4/2018 | Fink et al. |
| 2018/0121665 A1 | 5/2018 | Anderson et al. |
| 2018/0129684 A1 | 5/2018 | Wilson et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0165110 A1 | 6/2018 | Htay |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0367517 A1 | 12/2018 | Tus |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson, II et al. |
| 2019/0034095 A1 | 1/2019 | Singh et al. |
| 2019/0043231 A1 | 2/2019 | Uzgin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102278 A1 | 4/2019 | Gahlin et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0147515 A1 | 5/2019 | Hurley et al. |
| 2019/0171423 A1 | 6/2019 | Mishra et al. |
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0268152 A1 | 8/2019 | Sandoval et al. |
| 2019/0278938 A1 | 9/2019 | Greene et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0311115 A1 | 10/2019 | Lavi et al. |
| 2019/0318312 A1 | 10/2019 | Foskett et al. |
| 2019/0320038 A1 | 10/2019 | Walsh et al. |
| 2019/0324813 A1 | 10/2019 | Bogineni et al. |
| 2019/0339955 A1 | 11/2019 | Kuo et al. |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0034471 A1 | 1/2020 | Danilov et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |

(56) References Cited

U.S. PATENT DOCUMENTS

| | | | |
|---|---|---|---|
| 2020/0081745 A1 | 3/2020 | Cybulski et al. |
| 2020/0110691 A1 | 4/2020 | Bryant et al. |
| 2020/0120120 A1 | 4/2020 | Cybulski |
| 2020/0134030 A1 | 4/2020 | Natanzon et al. |
| 2020/0136933 A1 | 4/2020 | Raskar |
| 2020/0153798 A1 | 5/2020 | Liebherr |
| 2020/0153897 A1 | 5/2020 | Mestery et al. |
| 2020/0167208 A1 | 5/2020 | Floes et al. |
| 2020/0192646 A1 | 6/2020 | Yerramreddy et al. |
| 2020/0213151 A1 | 7/2020 | Srivatsan et al. |
| 2020/0241930 A1 | 7/2020 | Garg et al. |
| 2020/0327236 A1 | 10/2020 | Pratt et al. |
| 2020/0348979 A1 | 11/2020 | Calmon |
| 2020/0349067 A1 | 11/2020 | Syamala et al. |
| 2020/0366587 A1 | 11/2020 | White et al. |
| 2020/0401455 A1 | 12/2020 | Church et al. |
| 2021/0019056 A1 | 1/2021 | Mangione-Tran |
| 2021/0081233 A1 | 3/2021 | Mullen et al. |
| 2021/0117534 A1 | 4/2021 | Maximov et al. |
| 2021/0124822 A1 | 4/2021 | Tiwary et al. |
| 2021/0176333 A1 | 6/2021 | Coleman et al. |
| 2021/0294646 A1 | 9/2021 | Hassaan et al. |
| 2021/0311758 A1 | 10/2021 | Cao et al. |
| 2022/0012083 A1 | 1/2022 | Brooker et al. |
| 2022/0214863 A1 | 7/2022 | Clement et al. |
| 2022/0391238 A1 | 12/2022 | Wagner |
| 2023/0024699 A1 | 1/2023 | Bayoumi et al. |
| 2024/0160461 A1* | 5/2024 | Nanda ............... G06F 9/45558 |
| 2025/0080416 A1* | 3/2025 | Mitrache ............... H04L 41/16 |

FOREIGN PATENT DOCUMENTS

| | | |
|---|---|---|
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 101764824 A | 6/2010 |
| CN | 102171712 A | 8/2011 |
| CN | 102246152 A | 11/2011 |
| CN | 102365858 A | 2/2012 |
| CN | 102420846 A | 4/2012 |
| CN | 102761549 A | 10/2012 |
| CN | 103098027 A | 5/2013 |
| CN | 103140828 A | 6/2013 |
| CN | 103384237 A | 11/2013 |
| CN | 103731427 A | 4/2014 |
| CN | 104111848 A | 10/2014 |
| CN | 104160378 A | 11/2014 |
| CN | 104243479 A | 12/2014 |
| CN | 104903854 A | 9/2015 |
| CN | 105122243 A | 12/2015 |
| CN | 105956000 A | 9/2016 |
| CN | 106921651 A | 7/2017 |
| CN | 107534672 A | 1/2018 |
| EP | 2663052 A1 | 11/2013 |
| JP | 2002-287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011-257847 A | 12/2011 |
| JP | 2012-078893 A | 4/2012 |
| JP | 2012-104150 A | 5/2012 |
| JP | 2013-156996 A | 8/2013 |
| JP | 2014-525624 A | 9/2014 |
| JP | 2016-507100 A | 3/2016 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| KR | 10-357850 B1 | 10/2002 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/039514 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |
| WO | WO 2020/123439 A1 | 6/2020 |
| WO | WO 2020/264431 A1 | 12/2020 |
| WO | WO 2021/108435 A1 | 6/2021 |
| WO | WO 2021/127577 A1 | 6/2021 |
| WO | WO 2023/107649 A1 | 6/2023 |

OTHER PUBLICATIONS

Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.

Anonymous: "Amazon Cognito Developer Guide," Jun. 24, 2001, XP093030075, retrieved from the internet: URL:https://web.archive.org/web/20210624153941if_/https://docs.aws.amazon.com/cognito/latest/developerguide/cognito-dg.pdf [retrieved on Mar. 9, 2023] the whole document.

Anonymous: "Amazon Simple Workflow Service Developer Guide API Version Jan. 1, 2025," Jun. 11, 2016 (Jun. 11, 22016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.

Anonymous: "alias (command)—Wikipedia," Jun. 28, 2016, p. 106, XP093089956, Retrieved from the Internet: URL:https://en.wikipedia.org/w/index.php?title=Alias_(command)&oldid=727315645 [retrieved on Oct. 9, 2023.

Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.

Anonymous: "AWS Lambda Developer Guide," Jul. 1, 2021, XP093024770, retrieved from the internet: URL:https://web.archieve.org/web/20210701100128if_/https://docs.aws.amazon.com/lambda/latest/dg/lambda-dg.pdf [retrieved on Feb. 17, 2023] the whole document.

Anonymous: "AWS Lambda Developer Guide," Jul. 1, 2021, XP093024770, retrieved from the internet: URL:https://web.archive.org/web/20210701100128if_/https://docs.aws.amazon.com/lambda/latest/dg/lambda-dg.pdf [retrieved on Feb. 17, 2023] the whole document.

Anonymous: "Docker run reference", Dec. 7, 2015, XP055350246, Retrieved from the Internet:URL:https://web.archive.org/web/20151207111702/https:/docs.docker.com/engine/reference/run/ [retrieved on Feb. 28, 2017].

(56) References Cited

OTHER PUBLICATIONS

Anonymous: SaaS Tenant Isolution Strategies Isolating Resources in a Multi-Tenant Environment,: Aug. 1, 2020, XP093030095, retrieved from the internet: URL:https://dl.awsstatic.com/whitepapers/saas-tenant-isolation-strategies.pdf [retrieved on Mar. 9, 2023] the whole document.
Anonymous: "Security Overview of AWS Lambda," Aug. 11, 2021, XP093030100, retrieved from the internet:URL:https://web.archive.org/web/20210811044132if_/https://docs.aws.amazon.com/whitepapers/latest/security-overview-aws-lambda/security-overview-aws-lambda.pdf [retrieved Mar. 9, 2023] the whole document.
Abebe et al., "EC-Store: Bridging the Gap Between Storage and Latency in Distribute Erasure CodedSystems", IEEE 38th International Conference on Distributed Computing Systems, 2018, pp. 255-266.
Adapter Pattern, Wikipedia,https://en.wikipedia.org/w/index.php?title=Adapter_pattern&oldid=654971255, [retrieved May 26, 2016], 6 pages.
Amazon, "AWS Lambda: Developer Guide", Jun. 26, 2016 Retrieved from the Internet,URL:http://docs.aws.amazon.com/lambda/latest/dg/lambda-dg.pdf, [retrieved on Aug. 30, 2017], 314 pages.
Amazon, "AWS Lambda: Developer Guide", Apr. 30, 2016 Retrieved from the Internet, URL:https://web.archive.org/web/20160430050158/http://docs.aws.amazon.com:80/lambda/latest/dg/lambda-dg.pdf, 346 pages.
Amazon, "AWS Lambda: Developer Guide", Retrieved from the Internet, 2019, URL : http://docs.aws.amazon.com/lambda/ latest/dg/lambda-dg.pdf, 521 pages.
Balazinska et al., Moirae: History-Enhanced Monitoring, Published: Jan. 2007, 12 pages.
Bebenita et al., "Trace-Based Compilation in Execution Environments without Interpreters," ACM, Copyright 2010, 10 pages.
Ben-Yehuda et al., "Deconstructing Amazon EC2 Spot Instance Pricing", ACM Transactions on Economics and Computation 1.3, Sep. 2013, 15 pages.
Bhadani et al., Performance evaluation of web servers using central load balancing policy over virtual machines on cloud, Jan. 2010, 4 pages.
Bryan Liston, "Ad Hoc Big Data Processing Made Simple with Serverless Map Reduce", Nov. 4, 2016, Amazon Web Services <https ://laws. amazon .com/bl ogs/compute/ad-hoc-big-data-processi ng-made-si mple-with-serverless- mapred uce >.
CodeChef ADMIN discussion web page, retrieved from https://discuss.codechef.com/t/what-are-the-memory-limit-and-stack-size-on-codechef/14159, retrieved on Sep. 10, 2019.
CodeChef IDE web page, Code, Compile & Run, retrieved from https://www.codechef.com/ide, retrieved on Sep. 9, 2019.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, Nov. 2014, 13 pages.
Deis, Container, Jun. 2014, 1 page.
Dean et al., "MapReduce: Simplified Data Processing on Large Clusters", ACM, 2008, pp. 107-113.
Dombrowski, M., et al., Dynamic Monitor Allocation in the Java Virtual Machine, JTRES '13, Oct. 9-11, 2013, pp. 30-37.
Dornemann et al., "On-Demand Resource Provisioning for BPEL Workflows Using Amazon's ElasticCompute Cloud", 9th IEEE/ACM International Symposium on Cluster Computing and the Grid, 2009, pp. 140-147.
Dynamic HTML, Wikipedia page from date Mar. 27, 2015, retrieved using the WayBackMachine, fromhttps://web.archive.org/web/20150327215418/https://en.wikipedia.org/wiki/Dynamic_HTML, 2015, 6 pages.
Ekanayake et al., "Twister: A Runtime for Iterative MapReduce", ACM, 2010, pp. 810-818.
Espadas, J., et al., A Tenant-Based Resource Allocation Model for Scaling Software-as-a-ServiceApplications Over Cloud Computing Infrastructures, Future Generation Computer Systems, vol. 29, pp. 273-286, 2013.
Fan et al., Online Optimization of VM Deployment in IaaS Cloud, Dec. 17, 2012—Dec. 19, 2012, 6 pages.
Ha et al., A Concurrent Trace-based Just-In-Time Compiler for Single-threaded JavaScript, utexas.edu, Jun. 2009.
Hammoud et al., "Locality-Aware Reduce Task Scheduling for MapReduce", IEEE, 2011, pp. 570-576.
Han et al., Lightweight Resource Scaling for Cloud Applications, May 13, 2012—May 16, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051 /http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR, va123, 2014.
http://www.codechef.com/ide web page from date Apr. 5, 2015, retrieved using the WayBackMachine, fromhttps://web.archive.org/web/20150405045518/http://www.codechef.com/ide, 2015.
Huang, Zhe, Danny HK Tsang, and James She. "A virtual machine consolidation framework formapreduce enabled computing clouds." 2012 24th International Teletraffic Congress (ITC 24). IEEE, Sep. 4, 2012-Sep. 7, 2012.
Huang et al., "Erasure Coding in Windows Azure Storege", USENIX, 2012 in 12 pages.
Kamga et al., Extended scheduler for efficient frequency scaling in virtualized systems, Jul. 2012, 8 pages.
IBM, what is Serverless computing, https://www.IBM.com/topics/serverless#:-:test=Serverless%20is%20a%20cloud%20computing,managing%20servers%20or%20backend%20infrastructure, pp. 1-11 (Year: 2023).
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kim et al., "MRBench: A Benchmark for Map-Reduce Framework", IEEE, 2008, pp. 11-18.
Kraft et al., 10 performance prediction in consolidated virtualized environments, Mar. 2011, 12 pages.
Krsul et al., "VMPlants: Providing and Managing Virtual Machine Execution Environments for GridComputing", Supercomputing, 2004. Proceedings of the ACM/IEEESC 2004 Conference Pittsburgh, PA, XP010780332, Nov. 6-12, 2004, 12 pages.
Lagar-Cavilla et al., "SnowFlock: Virtual Machine Cloning as a First-Class Cloud Primitive", ACMTransactions on Computer Systems, vol. 29, No. 1, Article 2, Publication date: Feb. 2011, in 45 pages.
Lin, "MR-Apriori: Association Rules Algorithm Based on MapReduce", IEEE, 2014, pp. 141-144.
Meng et al., Efficient resource provisioning in compute clouds via VM multiplexing, Jun. 2010, 10 pages.
Merkel, "Docker: Lightweight Linux Containers for Consistent Development and Deployment", LinuxJournal, vol. 2014 Issue 239, Mar. 2014, XP055171140, 16 pages.
Monteil, Coupling profile and historical methods to predict execution time of parallel applications. Parallel and Cloud. Computing, Jul. 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Neenan, Sarah Compare Serverless tools and services in the Public cloud,https://www.techtarget.com/searchcloudcomputing/feature/Compare-serverless-tools-and-services-in-the-public-cloud, TechTarget, pp. 1-4 (Year: 2023).

(56) References Cited

OTHER PUBLICATIONS

Qian, H., and D. Medhi, et al., Estimating Optimal Cost of Allocating Virtualized Resources With Dynamic Demand, ITC 2011, Sep. 2011, pp. 320-321.
Rashmi et al., "EC-Cache: Load-Balance, Low-Latency Cluster Caching with Online Erasure Coding", USENIX, 2016, pp. 401-417.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Search Query Report from IP.com, performed Dec. 2, 2020.
Search Query Report from IP.com, performed May 27, 2021.
Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a-multi-tenant-saas-solution-using-aws-serverless-services/ [retrieved on Mar. 9, 2023] the whole document.
Shim (computing), Wikipedia,https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloudenvironment", Parallel and Distributed V Systems (ICPADS), IEEE, Dec. 16, 2014-Dec. 19, 2014. Retrieved on Feb. 14, 2019, Retrieved from the internet: URL<https://ieeexplore.iee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en .wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, fromhttps://web.archive.org/web/20150326230100/https://en .wikipedia.org/wiki/Recursion_(computer science), 2015.
Wikipedia: Serverless computing, https://en.wikipedia.org/wiki/Serverless_computing, pp. 107 (Year: 2023).
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication System Simulationin Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, And Analysis, 2012, American Society for Engineering Education, Jun. 10, 2012.
Zhang et al., VMThunder: Fast Provisioning of Large-Scale Virtual Machine Clusters, IEEETransactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
European Examination Report, re EP Application No. 17743108.7, dated Oct. 12, 2022.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
International Search Report and Written Opinion mailed Oct. 15, 2019 for International Application No. PCT/US2019/039246 in 16 pages.
International Preliminary Report on Patentability mailed Dec. 29, 2020 for International Application No. PCT/US2019/039246 in 8 pages.
International Search Report for Application No. PCT/US2019/038520 dated Aug. 14, 2019.
International Preliminary Report on Patentability for Application No. PCT/US2019/038520 dated Dec. 29, 2020.

(56) References Cited

OTHER PUBLICATIONS

International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.
International Search Report for Application No. PCT/US2020/039996 dated Oct. 8, 2020.
International Preliminary Report on Patentability for Application No. PCT/US2020/039996 dated Jan. 6, 2022.
International Search Report for Application No. PCT/US2020/062060 dated Mar. 5, 2021.
International Preliminary Report on Patentability for Application No. PCT/US2020/062060 dated Jun. 9, 2022 in 9 pages.

* cited by examiner

MANAGEMENT OF COMPUTING SERVICES FOR APPLICATIONS COMPOSED OF SERVICE VIRTUAL COMPUTING COMPONENTS

BACKGROUND

Computing systems can utilize communication networks to exchange data. In some implementations, a computing system can receive and process data provided by another computing system. For example, a computing system can receive data entered using another computing system, store the data, process the data, and so on. Some computing systems execute interactive or unattended applications in which data is processed or other operations are performed in response to user requests or other events.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
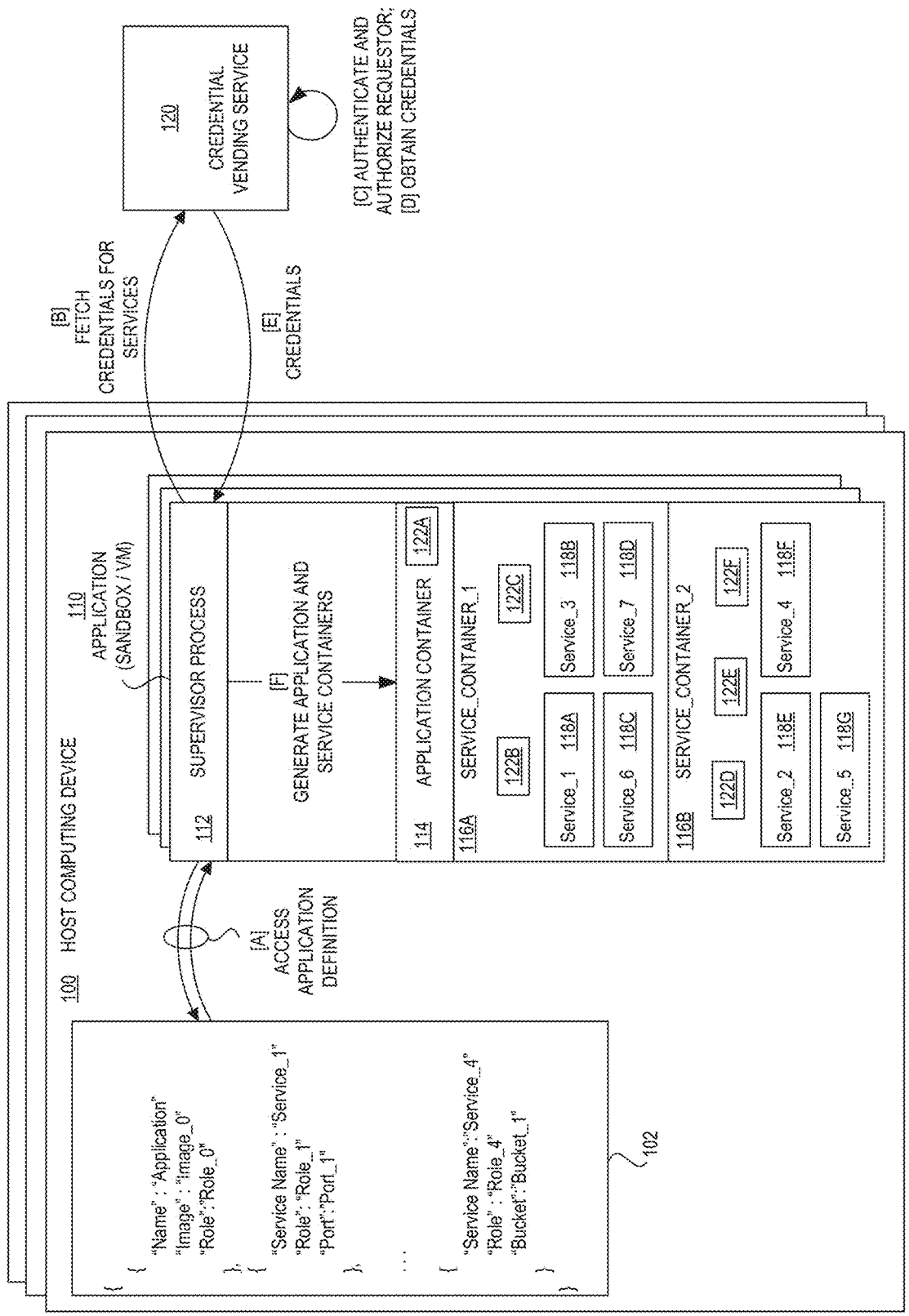
FIG. 1 is a block diagram depicting an illustrative environment in which management of computing services for applications composed of multiple service virtual computing components may be implemented according to some embodiments.

The present disclosure relates to generating and managing virtual computing components that provide multiple computing services, such that each computing service may be provided with differently-scoped access credentials. An application, such as software-as-a-service (SaaS) application or a serverless application, may be composed of one or more virtual computing components, such as virtual machine instances, containers, and the like. The platform on which the application's virtual computing components are hosted may provide various services, such as logging, executing tracing, networking, and the like. To increase efficiency (as well as prevent performance and/or operational issues), computing services that are related to each other by functionality may be included within a single service virtual computing component that may provide computing services to the application, the platform, or both, depending upon the configuration of the application. Thus, it becomes unnecessary to maintain service virtual computing components for each individual computing service to be provided and for each individual user of the service, thereby reducing the consumption of resources (e.g., processor and/or memory) as well as preventing errors resulting from the management of numerous service virtual computing components.

In addition, to further enhance security in the platform in which the application is executing (e.g., a host computing device in a data center or cloud environment), each computing service may be provided with a differently-scoped access credential that is tailored to only the subset of computing environment operations to be performed by the individual computing service, rather than using access credentials with permissions for all operations of the application or computing environment. Thus, if one computing service were to become compromised or fail, the security ramifications would be limited to only the scope of the access credentials under which the one computing service was executing, rather than extending to the entire scope of access for all components of the application or computing environment.

The terms "application" and "application software" are used herein in accordance with their usual and customary meaning in the field of computer technology, and refer to a computer program (or set of computer programs) designed to carry out a specific task (or set of tasks) other than those relating solely to the operation of a computing system itself. In contrast, system software may be understood to refer to a computer program designed to manage the operation of a computing device or system of computing devices, while services and service software may be understood to refer to computer programs designed to setup, manage, track, or tune the operation of a computing system or application. Applications may use the same services as used by system software, or applications and system software may use difference services for setup, manage, track, or tune operation of the respective components. Applications are typically executed by or at the instruction of end users, but are not necessarily interactive. For example, an application may be scheduled to execute or be triggered to execute in response to an event, and may perform various processing tasks before terminating without any end user interaction.

Some conventional network-based computing environments, such as data centers and cloud-based computing systems, use virtualization technologies to allow a single physical computing device to host one or more instances of virtual computing components (e.g., virtual machines, containers) that appear and operate as independent computing environments to users of a data center. With virtualization, a single physical computing device can create, maintain, delete, or otherwise manage virtual computing components (e.g., virtual machines, micro virtual machines, containers, etc.) in a dynamic manner. In turn, users can request compute resources from such a network-based computing environment, including single computing devices or a configuration of networked computing devices, and be provided with varying numbers of virtual computing resources.

Some users may compose applications of one or more virtual computing components that execute within a host computing device of a network-based computing environment. The network-based computing environment—also referred to herein as a "platform" for brevity—may include multiple computing services that provide services to applications and/or to components of the platform on which the applications execute. For example, such computing services may include at least one of a logging service, an execution trace service, or a network configuration service. Typically, for each of the computing services to be provided, a corresponding service virtual computing component is generated to implement such computing services. Due to such arrangement, each service virtual computing component only provides a single service. Further, each of the multiple service virtual computing components are managed separately with each service virtual computing component consuming its own set of computing resources (e.g., processor time and memory). Nevertheless, such arrangement may cause performance and/or operational issues. For example, each additional service virtual computing component provides increased overhead for the computing device hosting the multiple service virtual computing components. More specifically, the increased consumption of computing resources (due to each additional service virtual computing component) may diminish the speed at which the processor performs processing (or memory access) and/or may decrease the amount of memory available. Likewise, the management of numerous service virtual computing components may overwhelm the computing device, thereby causing multiple errors.

Some aspects of the present disclosure address some or all of the issues noted above, among others, through use of service virtual computing components that each provide multiple computing services. Moreover, some or all of the different services that are part of the same service virtual computing component may each use differently-scoped access credentials.

An application may be defined by configuration data (e.g., a configuration file) that specifies the different computing services to be provided. When a platform initializes an application, the platform may use the configuration data to determine the virtual computing components (e.g., for the application) to be instantiated, any virtual computing component images to be used to launch virtual computing component instances, and the access roles under which each computing service is to assume. For example, the multiple computing services may provide services (1) that are related to logging, execution trace, and/or network configuration and (2) to the application and/or the platform computing environment in which the application is executing.

In some embodiments, the platform may use a system component, such as a supervisor process, to manage initialization of an application. The supervisor process may use the application configuration data to determine sets of computing services that have related functionality and determine service virtual computing components that are to be launched for each determined set of computing services. The supervisor process may further determine the access roles under which the computing services are to execute, and may undertake a process of obtaining access credentials for each role. In addition, the supervisor process may obtain particular images corresponding to each service virtual computing component, and launch each service virtual computing component for execution using the appropriate access credentials and images. Advantageously, a limited number of containers are launched, while providing the same amount of computing services requested by the user, such that each computing service may be assigned to an access role that is scoped specifically for the access that the computing service is to use to provide its assigned subset of application functionality.

In some embodiments, a credential vending service may be implemented to obtain, at run time, different access credentials for different computing services provided in the same virtual computing component of an application. For example, the credential vending service may be configured to assume various security roles, and interact with an authentication and authorization service to obtain access credentials (e.g., access key secret and session token) for the security roles. The credential vending service may be configured to trust a limited set of processes requesting credentials, including the supervisor process that sets up the application. The supervisor process may request, from the credential vending service, access credentials for each access role to be used for the application. The credential vending service may assume each role, and obtain the appropriate access credentials from an authentication and authorization service. The credential vending service can provide the access credential back to the supervisor process, and the supervisor process may inject the credentials into the appropriate service virtual computing components for use by the computing services included therein.

Various aspects of the disclosure will now be described with regard to certain examples and embodiments, which are intended to illustrate but not limit the disclosure. Although aspects of some embodiments described in the disclosure will focus, for the purpose of illustration, on particular examples of application architectures, virtual computing components, and access credential provisioning protocols, the examples are illustrative only and are not intended to be limiting. In some embodiments, the techniques described herein may be applied to additional or alternative application architectures, virtual computing components, access credential provisioning protocols, and the like.

Example Computing Environment and Application Launch

Figure 6:
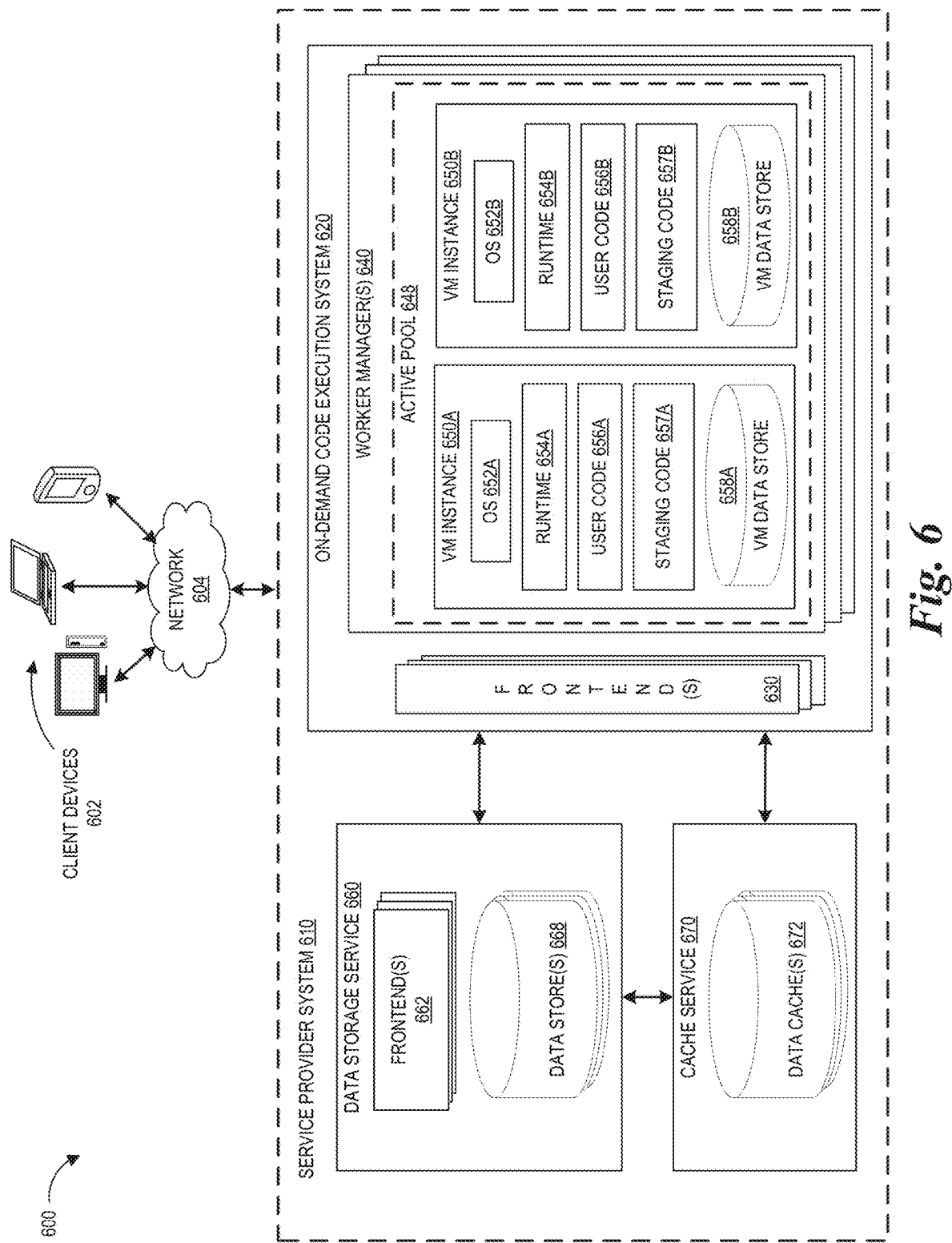
FIG. 6 is a block diagram of an illustrative computing environment in which environment in which an on-demand code execution system can operate in conjunction with a data storage system according to some embodiments.

With reference to an illustrative embodiment, FIG. 1 shows an example computing environment in which management of computing services for applications composed of one or more virtual computing components (VCCs) may be implemented. The features and services provided by and used to manage such applications may be implemented as web services consumable via one or more communication networks. In some embodiments, the features and services provided by and used to manage such applications are provided by one or more VCCs implemented in a hosted computing environment. The hosted computing environment may include one or more rapidly provisioned and released computing resources, such as computing devices, networking devices, and/or storage devices. A hosted computing environment may also be referred to as a "cloud" computing environment. One example of a cloud computing environment that provides an on-demand code execution system for "serverless" execution of virtualized, containerized applications is shown in FIG. 6 and described in greater detail below.

In the example illustrated in FIG. 1, the computing environment includes any number of host computing devices 100 and a credential vending service 120. The host computing devices 100 and credential vending service 120 may communicate with each other via one or more communication networks (not shown). Illustratively, a communication network may be a publicly-accessible network of linked networks, some or all of which may be operated by various distinct parties, for example the internet. In some cases, a network may include a private network, personal area network, local area network, wide area network, cellular data network, satellite network, etc., or some combination thereof, some or all of which may or may not have access to and/or from the internet.

Figure 5:
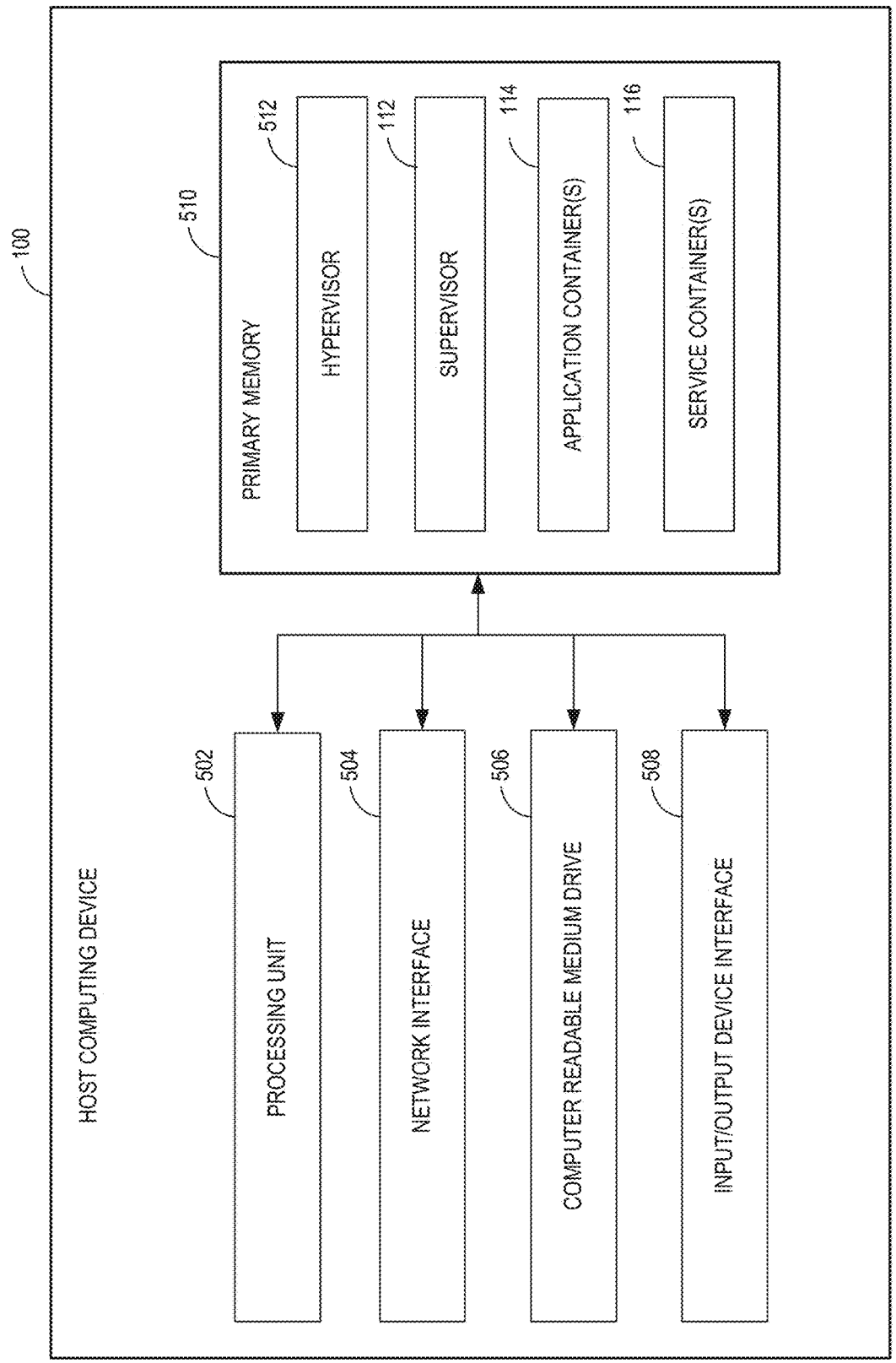
FIG. 5 is a block diagram of an illustrative computing device that may implement aspects of the present disclosure according to some embodiments.

A host computing device 100, credential vending service 120, or both may be implemented using any of a variety of computing systems, such as server computing devices, mainframe computing devices, midrange computing devices, or the like. An example host computing device 100 and components thereof are illustrated in FIG. 5 and described in greater detail below. In some embodiments, a credential vending service 120 may be implemented using one or more host computing devices 100.

A host computing device 100 may execute any number of applications 110. In some embodiments, a hypervisor, or virtual machine monitor (VMM) on a host computing device 100 may allocate the host's hardware resources amongst various VCCs. For example, a single host computing device 100 may host dozens, hundreds, or thousands of virtual machines (VMs), depending upon the computing resources available on the host computing device 100, the computing resources required for individual VMs, oversubscription protocols in use on the host, and the like. The VMs may in turn be used to host containers, which package up code and all its dependencies so an application (or portion thereof) can run quickly and reliably from one computing environment to another.

In some embodiments, as shown, an application 110 may be implemented within a VCC "sandbox" that is logically isolated from other sandboxes of the host computing device 100. For example, the sandbox may be a VM. The application 110 may be managed by a supervisor process 112, which may be a computational entity of the sandbox that is configured to launch or "bootstrap" the various containers or other VCCs that implement subsets of application functionality, and manage the overall lifecycle of the application 110.

Figure 2:
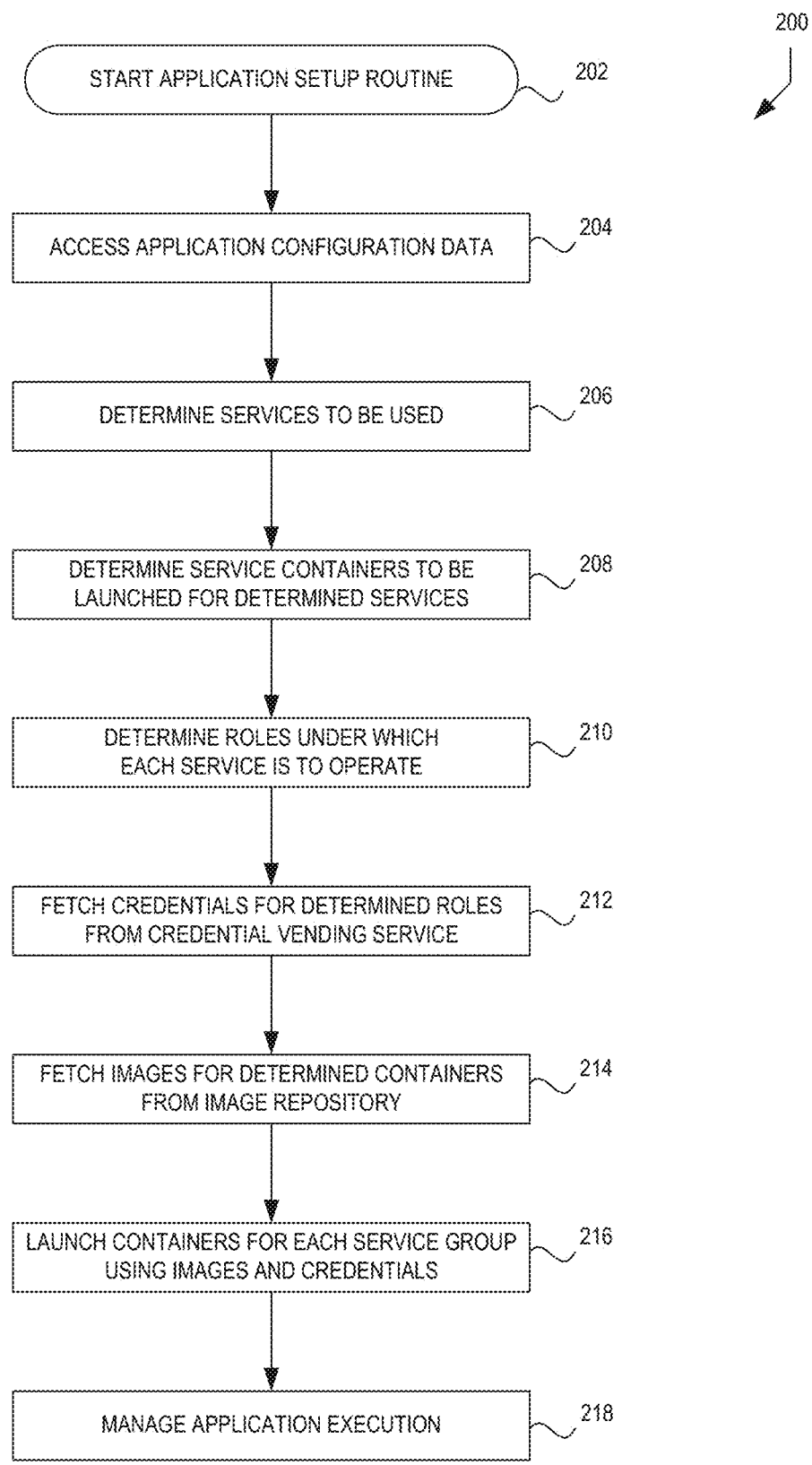
FIG. 2 is a flow diagram of an illustrative routine for management of computing services for applications composed of multiple service virtual computing components according to some embodiments

An example routine 200 that the supervisor process 112 may perform to launch various containers or other VCCs of an application 110 is shown in FIG. 2. The labeled data flows and interactions shown in FIG. 1 will be described in the context of routine 200.

Routine 200 begins at block 202. Routine 200 may begin in response to a customer request or instruction to launch an application 110 on a predetermined or dynamically determined schedule, or in response to some other event. When routine 200 is initiated, a set of executable program instructions stored on one or more non-transitory computer-readable media (e.g., hard drive, flash memory, removable media, etc.) may be loaded into memory (e.g., random access memory or "RAM") of a host computing device 100 (e.g., into a sandbox of the host computing device 100) and executed by one or more processors. In some embodiments, the routine 200 or portions thereof may be implemented on multiple processors, serially or in parallel.

At block 204, the supervisor process 112 may access a definition of the application 110 to be launched within the sandbox, as shown. The application 110 may be defined by application configuration data 102. A user of the network computing environment in which the application is to be executed (e.g., an application owner or administrator) may determine the application functionality to be provided by one or more VCCs, and the services of the platform that the application is to use. The platform may provide such computing services to an application VCC (e.g., application container 114), which may perform application functionality. The platform may also provide such services to a system computing component (e.g., supervisor process 112, request proxy, etc.), which may manage the lifecycle of the application. In some embodiments, the platform may automatically launch a container or other VCC that includes predetermined computing services provided for the system computing component, when launching the application 110. An image or other storage unit for application or service logic and data may be generated for each of the different VCCs. For example, an image or other storage unit for application logic and data may be generated for a container (e.g., application container 114) or other VCC corresponding to functionality of the application 110. In another example, an image or other storage unit for service logic and data may be generated for a container or other VCC (e.g., service VCC) corresponding to the computing services specified in the application configuration data 102.

The application configuration data 102 may specify an access role under which the application VCC(s) is/are to execute. For example, if there are multiple application VCCs to be initialized using different images, the application configuration data 102 may specify the same role for each application VCC such that each VCC is to be provided with the same credentials under which to execute. Alternatively, application configuration data 102 may specify different roles for different application VCCs such that those application VCC are to be provided with different credentials under which to execute.

In some embodiments, the application configuration data 102 may specify an access role under which computing services provided by service VCCs are to execute. For example, if there are multiple services of the platform that the application is to use, the application data 102 may specify the same role for each service, or may specify a different access role different of services (or subsets thereof) so that each computing service can execute under a role and access permissions scoped for the particular operations to be performed by the computing service. Moreover, the application configuration data 102 may provide service-specific configuration information for any or each of the computing services to be provided to the application. Service-specific configuration information may provide further configuration to a corresponding computing service, such that the functionality of the corresponding computing service may be enhanced or modified. Thus, application configuration data 102 for the application 110 may include a listing of the computing services and their respective identifiers, images to be used to launch instances of one or more VCCs (e.g., application container 114), access roles under which instances of the computing services are to execute, and service-specific configuration information to be used in modifying or enhancing the computing services.

In example illustrated in FIG. 1, at [A] the supervisor process 112 accesses application configuration data 102 that specifies a single application VCC to be instantiated using image_0 and to be executed using credentials for role_0. The application configuration data 102 further specifies that the platform is to provide four (4) computing services for the application 110: service_1 to be executed using credentials for role_1; through service_4 to be executed using credentials for role_4. In addition, as illustrated in FIG. 1, the computing services can also be executed using service-specific configuration information. For example, the service-specific configuration information for service_1 may include port_1, for example, to specify a port (e.g., a virtual data connection between computer programs) or port number to listen to when obtaining event logs in case that service_1 is providing a logging service (explained in detail below). In another example, the port_1 may be used to specify a port or port number to allow communication with an external network (e.g., Internet) in case that service_1 is providing a networking service (explained in detail below). In yet another example, the service-specific configuration information for service_4 may specify bucket_1 as the location to which traces should be stored in case that the service_4 is providing a trace service. It should be noted that, although FIG. 1 shows four (4) computing services that are included in the application configuration data 102, there may be more (or less) than four (4) computing services depending on the user's configuration. Although the application configuration data 102 shown in FIG. 1 indicates a different role and service-specific configuration information are to be used for each computing service, the example is provided for purposes of illustration only, and is not intended to be limiting. In some embodiments, two or more computing services may be launched using the same role and/or service-specific configuration information, depending upon the desired functionality for the computing services and design of the application 110. In addition, although the application configuration data 102 shown in FIG. 1 is formatted using a pseudo standard format like that of JavaScript Object Notion (JSON), application configuration data 102 may be generated, stored, and accessed in any format, such as Extensible Markup Language (XML), other standard text-based formats, binary formats, etc.

At block 206, the supervisor process 112 can determine the computing services to be used. In some embodiments, the supervisor process 112 determines the computing services to be used by the application based on the application configuration data 102. In the example illustrated in FIG. 1, the supervisor process 112 determines that the application is to use service_1 through service_4. In some embodiments, the supervisor process 112 determines the computing resources to be used by the platform in management of the application based on system configuration data, pre-programming of the supervisor process 112, or in some other manner. In the example illustrated in FIG. 1, the supervisor process 112 determines that the service_5 through service_7 are to be used.

At block 208, the supervisor process 112 can determine the containers or other service VCCs to launch. In some embodiments, the supervisor process 112 can determine the service VCCs to launch based on predetermined associations of services or sets thereof. For example, various service VCC images may be pre-generated in which functionally similar or related services are grouped together (e.g., an observability container image may include code for providing a logging service and an execution trace service, a networking container may include code for provisioning and managing network connections, etc.). The supervisor process 112 can select the service VCCs to be initialized based on the computing services specified in the application configuration data 102, computing services that the supervisor process 112 is pre-configured to use, computing services specified in platform configuration data, or some combination thereof.

In the example illustrated in FIG. 1, the supervisor process 112 determines that service_1, service_3, service_6, and service_7 (first set of computing services) have related functionality that has been grouped and is to be provided by a first service container, and that service_2, service_4, and service_5 (second set of computing services) also have related functionality that has been grouped together— though separately from the group prior group—and is to be provided by a second service container. In some embodiments, the supervisor process 112 may make such determinations based on mappings of services to service containers, platform configuration data, or another source of information about groupings of services and the corresponding containers that are to be used to provide the groupings. As such, the supervisor process 112 determines a service container or other VCC to launch for each of the first set of computing services and the second set of computing services. It should be noted that there may be an individual computing service that is determined by the supervisor process to not belong to any set of computing services. In such case, the supervisor process may launch a container or other VCC that includes the individual computing service without any other additional computing services.

At block 210, the supervisor process 112 can determine the roles under which each computing service is to operate. For services to be used by the application, the roles may be determined based on the application configuration data 102. For services to be used by components of the platform on which the application is executing, the roles may be determined based on platform configuration data, pre-programming of the supervisor process 112, or in some other manner. In the example illustrated in FIG. 1, the supervisor process 112 determines that service_1 through service_7 use role_1 through role_7, respectively.

At block 212, the supervisor process 112 can fetch credentials for the roles under which each computing services of the application 110 is to operate. As shown in FIG. 1, the supervisor process 112 may fetch the credentials from the credential vending service 120, at [B]. In response, at [C], the credential vending service 120 may authenticate and authorize the requestor, supervisor process 112, to determine whether the credential vending service 120 is authorized to obtain the credentials being requested by the supervisor process 112. After authenticating the supervisor process 112, the credential vending service 120 obtain credentials requested by the supervisor process 112, at [D]. After obtaining the credentials, the credential vending service 120 communicates the credentials to the supervisor process 112, at [E].

Figure 3:
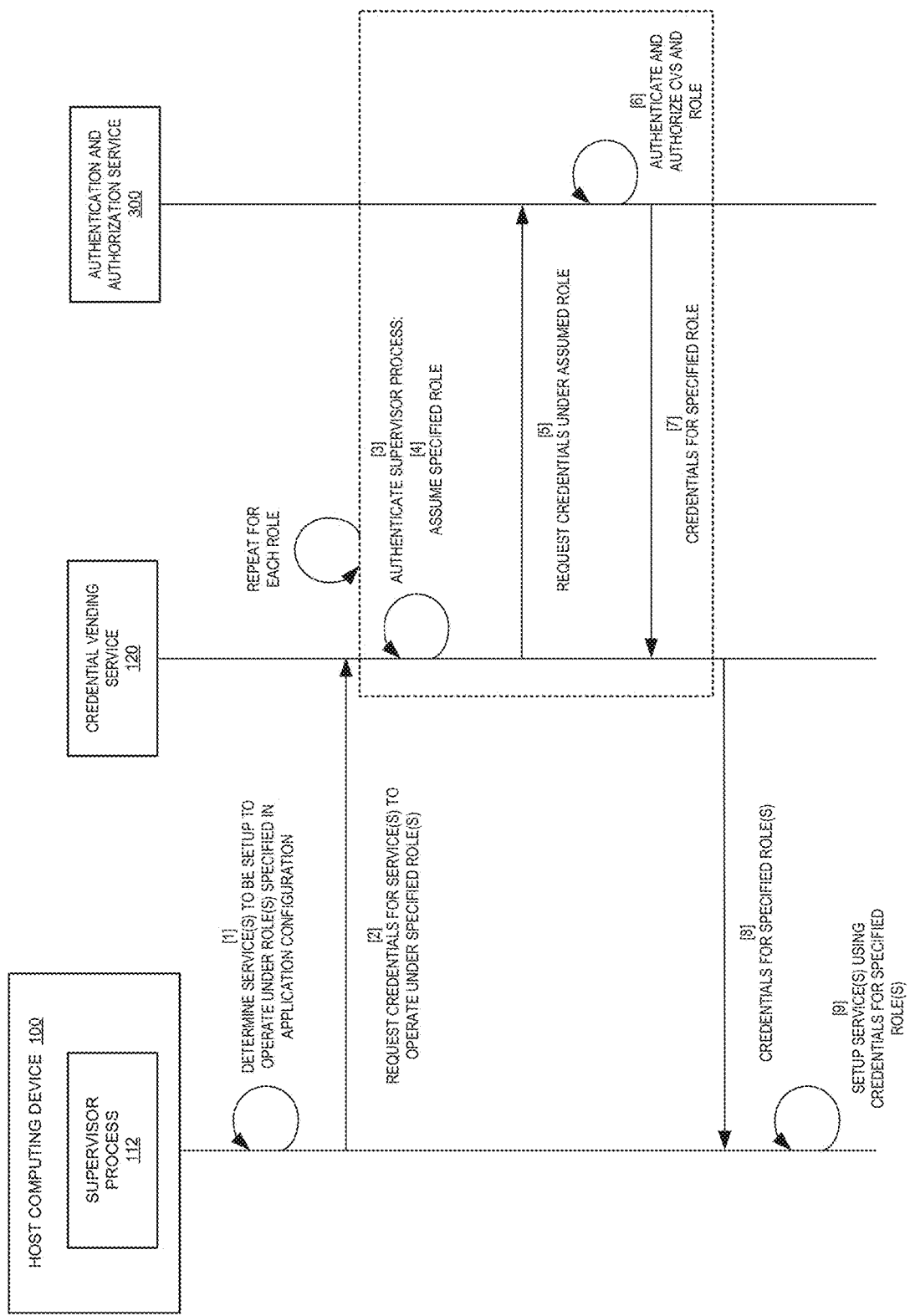
FIG. 3 illustrates data flows and interactions between a supervisor process, a credential vending service, and an authentication and authorization service according to some embodiments.

FIG. 3 illustrates an example protocol that the supervisor process 112 and credential vending service 120 may perform to obtain credentials for use by a computing service of the application 110. At [1], the supervisor process 112 determines that a computing service is to operate under a particular role, as described in greater detail above. At [2], the supervisor process 112 can send, to the credential vending service 120, a request for credentials for the specified role. The request may be sent as a hypertext transfer protocol (HTTP) request, application programming interface (API) call, or using some other request mechanism for communicating over a network with the credential vending service 120. The request may include data specifying the role for which credentials are to be obtained (e.g., a unique role identifier), data identifying the supervisor process (e.g., a unique process identifier or account identifier), data identifying the application (e.g., a unique application identifier), data identifying the user/account owner/administrator of the application (e.g., a unique account identifier), other data, or some combination thereof.

At [3], the credential vending service 120 may authenticate the supervisor process 112. In some embodiments, the credential vending service may be configured to trust a limited set of credential request sources, including (or in some embodiments exclusively limited to) the supervisor processes that set up applications. The supervisor process 112 may execute under certain credentials, and the credential vending service 120 can authenticate the credentials of the supervisor process 112 prior to fetching and providing requested credentials for computing services of the application 110.

At [4], the credential vending service 120 may assume a role for which credentials are to be obtained. By assuming the role, the credential vending service 120 holds itself out as properly executing under the role and authorized to obtain credentials associated with the role, credentials which provide permission to access data and perform other computing operations granted to members of the role. For example, the credential vending service 120 may be implemented such that it is permitted to assume any role for which credentials have been requested. As another example, the credential vending service 120 may be implemented such that it is permitted to assume a limited set of roles available to be used by computing services.

At [5], the credential vending service 120 may request, from an authentication and authorization service 300, the specified credentials under the assumed role. In some embodiments, the authentication and authorization service 300, also referred to as an authentication, authorization, and accounting (AAA) service, may serve as a central repository for credentials, and as a central identity and access management authority within the network computing environment.

The authentication and authorization service 300 may authenticate the credential vending service 120 at [6], and determine whether the credential vending service 120 is authorized to obtain the credentials being requested. If the credential vending service 120 is authenticated and authorized to obtain the requested credentials, then the authentication and authorization service 300 may return the requested credentials at [7]. For example, the credential returned to the credential vending service 120 may include an access key secret and a session token. After obtaining the requested credentials from the authentication and authorization service 300 (for the first credential), the actions performed at [3] to [7] are repeated until the credentials are obtained for each role specified in the application configuration data and/or in data regarding services to be used by the supervisor process 112 or other components of the platform.

At [8], the credential vending service 120 can send the requested credentials to the supervisor process 112, and the supervisor process 112 may use the credentials to setup a computing service for a corresponding VCC as described in greater detail below. Although the interactions and data flows in FIG. 3 relate to requesting and obtaining a single access credential, the example is provided for ease of illustration only, and is not intended to be limiting. In some embodiments, the supervisor process 112 may send multiple requests, serially or in parallel, to the credential vending service 120 (e.g., a different request for each specified set of credentials).

Returning to FIG. 2, at block 214 the supervisor process 112 may fetch images for the VCCs to be launched. In some embodiments, the network computing environment may include an image repository, such as a set of one or more storage nodes configured to store and serve images for containers or other VCCs. The images may include all application software, utilities, and configuration settings needed for a container to be instantiated into a running state. For example, the images may allow the instantiation of a container or other VCC for an application or a computing service. For the service VCCs that are instantiated for provision of computing services, the computing services may be further configured based on the service-specific configuration information in the application configuration data 102. For example, if the VCC is an "observability" VCC that provides logging services (among other observability services), the logging service may be provided with a default port number for a logging service. However, in some cases the application configuration data 102 may specify a different port number instead. As such, the service container or other VCC may be launched with the computing service therein being configured with the port number specified in the application configuration data 102 (instead of the default port number). In yet another example, the image corresponding to a service VCC may include all the computing services related by functionality. In other words, an image for a service VCC corresponding to observability services (explained in detail below) may include all the computing services related to observability, while an image for a service VCC corresponding to networking services (explained in detail below) may include all the computing services related to networking. As such, when the image is used to launch the container or other VCC, the code for all the computing services (e.g., for networking or observability) are included in the container or VCC, regardless of whether the application configuration data 102 specified such services. The result is that the computing services specified in the application configuration data 102 are activated, while the computing services not specified in the application configuration data 102 are inactive.

At block 216, the supervisor process 112 may launch the VCCs with the images and credentials acquired as described above. Launching a VCC may include instantiating a VCC from an image, and then provisioning the instance with an appropriate credential for each of the computing services therein. In some embodiments, after instantiating the VCC from an image, the VCC may also be configured using service-specific configuration information for each of the computing services therein.

In the example shown in FIG. 1, at [F], the supervisor process 112 instantiates application container 114 (for implementing and executing application 110) and service_container_1 116A and service_container_2 116B. Application container 114 is provisioned with credential 122A. Service_container_1 116A includes four (4) computing services (service_1 118A, service_3 118B, service_6 118C and service_7 118D) and two (2) credentials (credential 122B and credential 122C). In this configuration, there may be multiple combinations of assigning the two (2) credentials to the four (4) computing services (depending on the application configuration data 102). For example, both service_1 118A and service_6 118C may be provisioned with credential 122B, while both service_3 118B and service_7 118D may be provisioned with credential 122C, or vice versa. In another example, three (3) of the computing services may be provisioned with credential 122B, while the remaining computing service is provisioned with credential 122A, or vice versa. In other words, a credential may be used for more than one computing service. Service_container_2 116B includes service_2 118E (provisioned with credential 122D), service_5 (provisioned with credential 122E), and service_4 (provisioned with credential 122F).

At block 218, the supervisor process 112 may manage execution of the application 110. Managing execution of the application 110 may include monitoring for failures of VCCs and, when one is detected, re-launching the VCC with the appropriate image and credentials (for each of the computing services therein) to resume operation.

Example Multi-Container Application

Figure 4:
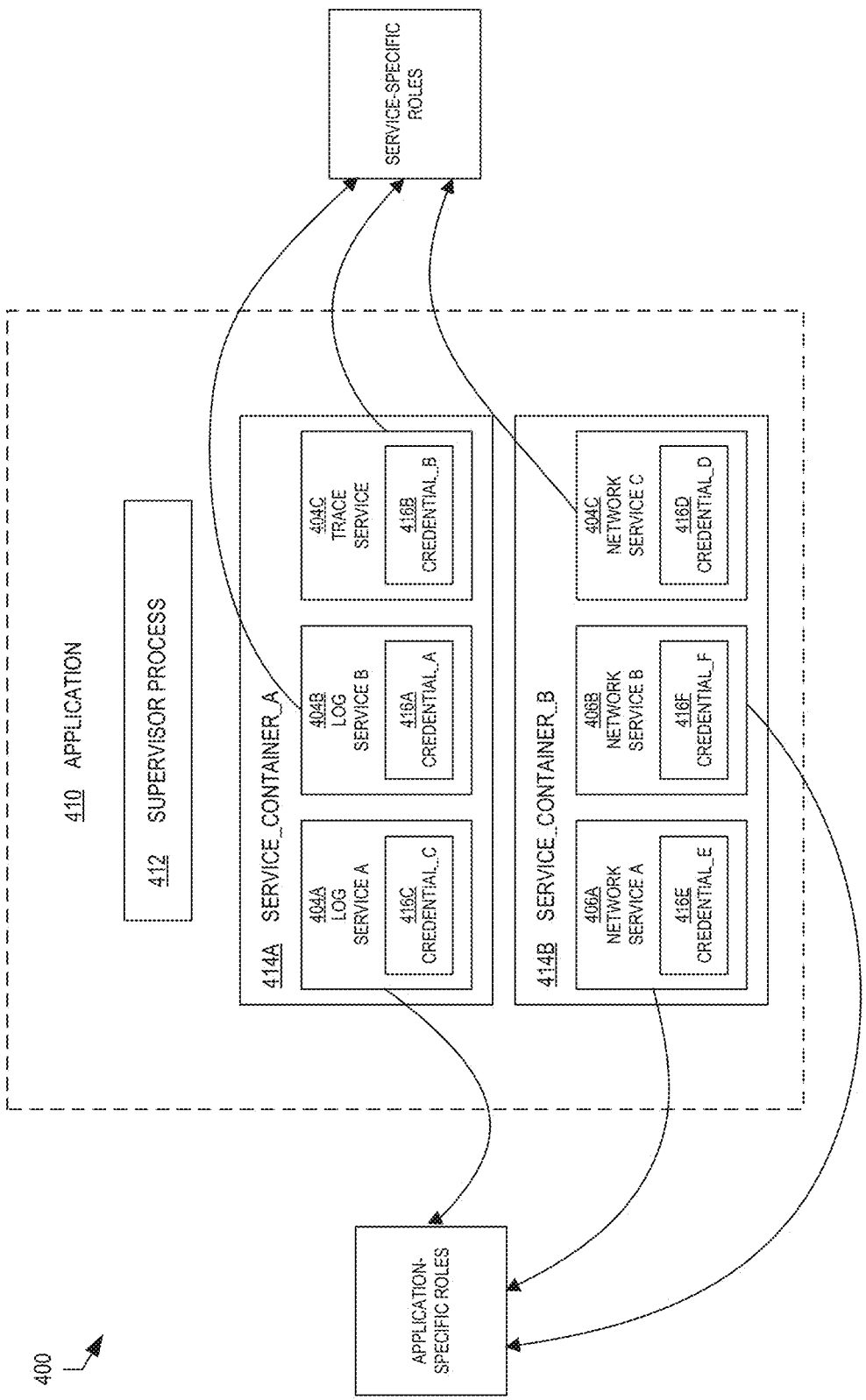
FIG. 4 illustrates data flows and interactions between a supervisor process, various service virtual computing components of an application, and various computing resources external to the application according to some embodiments.

FIG. 4 illustrates an example multi-container application 410 that may be setup by a supervisor process 412 as described in greater detail above. The application 410 uses various computing resources and services available to applications executing within the network computing environment 400.

In the illustrated embodiment, the application 410 includes a service_container_A 414A and a service_container_B 414B. Each of the service_container_A 414A and the service_container_B 414B may provide computing services that have an application-specific role, which are computing services provided to an application computing component (e.g., application 410) or have a service-specific role, which are computing services provided to a system computing component (e.g., supervisor process 412). The service_container_A 414A includes computing services related to observability, which may be (but is not limited to) services related to observing data in, for example, an application computing component (e.g., another container of application 410 for executing application-specific code) or a system computing component (e.g., supervisor process 412). Such observability services may include a logging service that serves as a repository for event logs of an application computing component or a system computing component. For example, applications may send event logs to the logging service where they may be accessed by users (e.g., application owners or administrators) to monitor or troubleshoot the operation of the application computing component or system computing component. The observability services may also include a trace service (e.g., execution trace) in which data (e.g., requests) are traced as they traverse the application computing component (e.g., application 410) or the system computing component (e.g., supervisor process 412). As such, it should be noted that the containers or other VCC (e.g., service_container_A 414A) may not necessarily include the same exact computing services (logging vs. trace), but may include computing services that have similar functionality (e.g., observing) and that may provide services to different entities (e.g., application computing component, system computing component). The service_container_B 414B includes computing services related to networking, which may, for example, provide computing services that allow the application computing component (e.g., application 410) or the system computing component (e.g., supervisor process 412) to access (or communicate via) a network (e.g., Internet).

As illustrated in FIG. 4, the service_container_A 414A includes a log service A 404A, log service 404B, and trace service 404C. The log service A 404A is provided in an application-specific role, in which the credential_C 416C provisioned to the log service A 404A to support an application computing component (e.g., application 410). The log service B 404B is provided in a service-specific role, in which the credential_A 416A is provisioned to the log service B 404B to allow access to a system computing component (e.g., supervisor process 412). The trace service 404C is provided in a service-specific role, in which the credential_B 416B is provisioned to the trace service 404C to allow access to a system computing component. The network service A 406A is provided in an application-specific role, in which the credential_E 416E is provisioned to the network service A 406A to allow access to an application computing component (e.g., application 410). The network service B 406B is provided in an application-specific role, in which the credential_F 416F is provisioned to the network service A 406A to allow access to an application computing component. The network service C 406C is provided in a service-specific role, in which the credential_D 416D is provisioned to the network service C 406C to allow access to a system computing component.

As shown in FIG. 4, although both the log service B 404B and the trace service 404C have the same role (i.e., service-specific role), each is provided with a different credential, credential_A 416A, credential_B 416B, respectively. The credential_A 416A may allow the log service B 404B access to a first set of specific data (e.g., events) in the system computing component but not allow the log service B 404B access to the remaining data in the system computing component. Likewise, the credential_B 416B may allow the trace service 404C access to a second set of specific data to perform tracing in the system computing component, but not allow the trace service 404C to access the remaining data (e.g., request or events) in the system computing component. In other words, the credentials may allow the computing services access to specific portions of the application computing component or the system computing component, while simultaneously preventing access to remaining portions of the application computing component or the system computing component.

In an exemplary embodiment, the aforementioned credentials may also include an additional feature, in which the credentials provide permission for user access of corresponding computing services. As discussed previously, although both the log service B 404B and the trace service 404C have the same role (i.e., service-specific role), each is provided with a different credential, credential_A 416A, credential_B 416B, respectively. Credential_A 416A may allow a first user (e.g., administrator) to access the services provided by the log service B 404B. However, such first user may not be granted permission to access the services provided by the trace service 404C. Likewise, Credential_B 416B may allow a second user (e.g., another administrator) to access the services provided by the trace service 404C. However, the second user may not be granted permission to access the services provided by the log service B 404B. This may be the case even if the first user and the second user belong to the same entity (e.g., group, organization, company).

Example Host Computing Device

FIG. 5 illustrates an example host computing device 100 that may be used in some embodiments to execute the processes and implement the features described above. In some embodiments, the host computing device 100 may include: one or more computer processors 502, such as physical central processing units (CPUs) or graphics processing units (GPUs); one or more network interfaces 504, such as a network interface cards (NICs); one or more computer readable medium drives 506, such as hard disk drives (HDDs), solid state drives (SSDs), flash drives, and/or other persistent non-transitory computer-readable media; and one or more computer readable memories 510, such as random access memory (RAM) and/or other volatile non-transitory computer-readable media. The network interface 504 can provide connectivity to one or more networks or computing devices. The computer processor 502 can receive information and instructions from other computing devices or services via the network interface 504. The network interface 504 can also store data directly to the computer-readable memory 510. The computer processor 502 can communicate to and from the computer-readable memory 510, execute instructions and process data in the computer-readable memory 510, etc.

The computer-readable memory 510 may include computer program instructions that the computer processor 502 executes in order to implement one or more embodiments.

The computer-readable memory 510 can store hypervisor 512 that provides computer program instructions for use by the computer processor 502 in the general administration and operation of the host computing device 100 and management of virtual component components, such as virtual machines in which applications execute. The computer-readable memory 510 can also include computer program instructions for the supervisor process 112 and containers of the application, such as container_1 114, and service containers, such as service_container_1 116A and service_container_2 116B.

Example On-Demand Code Execution System

In some embodiments, some or all of the VCCs of an application may be launched, managed, and/or hosted by an on-demand code execution system. An on-demand code execution system may provide a network-accessible service enabling users to submit or designate computer-executable source code—also referred to herein as "function code," or simply as "code" for brevity—to be executed by virtual machine instances on the on-demand code execution system. Each set of function code on the on-demand code execution system may define a "task," and implement specific functionality corresponding to that task when executed on a virtual machine instance of the on-demand code execution system. Individual tasks or sets of related tasks may be implemented within a single VCCs, and an application may be composed of multiple such VCCs. To provide the security benefits described above, individual computing services in the VCCs may be provided with credentials scoped for the access and permissions needed to perform their own respective tasks, without access or permissions to perform other tasks being managed by other VCCs of the application.

FIG. 6 is a block diagram of an illustrative operating environment 600 in which a service provider system 610 operates to enable client devices 602 to submit or request invocation of user-defined code—including applications to be composed of multiple containers—by an on-demand code execution system 620.

By way of illustration, various example client devices 602 are shown in communication with the service provider system 610, including a desktop computer, laptop, and a mobile phone. In general, the client devices 602 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like.

Generally described, the data storage service 660 can operate to enable clients to read, write, modify, and delete data, such as files, objects, blocks, or records, each of which represents a set of data associated with an identifier (an "object identifier" or "resource identifier") that can be interacted with as an individual resource. For example, an object may represent a single file submitted by a client device 602 (though the data storage service 660 may or may not store such an object as a single file). This object-level interaction can be contrasted with other types of storage services, such as block-based storage in which data is manipulated at the level of individual blocks or database storage in which data manipulation may occur at the level of tables or the like.

The data storage service 660 illustratively includes one or more frontends 662, which provide an interface (a command-line interface (CLIs), application programing interface (APIs), or other programmatic interface) through which client devices 602 can interface with the service 660 to configure the service 660 on their behalf and to perform I/O operations on the service 660. For example, a client device 602 may interact with a frontend 662 to create a collection of data objects on the service 660 (e.g., a "bucket" of objects) and to configure permissions for that collection. Client devices 602 may thereafter create, read, update, or delete objects within the collection based on the interfaces of the frontends 662.

During general operation, frontends 662 may be configured to obtain a call to a request method, and apply that request method to input data for the method. For example, a frontend 662 can respond to a request to PUT input data into the service 660 as an object by storing that input data as the object on the service 660.

Data may be stored, for example, on data stores 668, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). As a further example, the frontend 662 can respond to a request to access a data set or portion thereof from the service 660 by retrieving the requested data from the stores 668 (e.g., an object representing input data to a GET resource request), and returning the object to a requesting client device 602.

In some cases, calls to a request method may invoke one or more native data manipulations provided by the service 660. For example, a SELECT operation may provide an SQL-formatted query to be applied to an object (also identified within the request), or a GET operation may provide a specific range of bytes of an object to be returned.

The service provider system 610 illustratively includes a cache service 670 configured to cache data sets for code executed by the on-demand code execution system 620. Data may be cached, for example, on data caches 672, which correspond to any data storage such hard disk drives (HDDs), solid state drives (SSDs), network accessible storage (NAS), storage area networks (SANs), non-volatile random access memory (NVRAM), random access memory (RAM), or any of a variety of storage devices known in the art. Although illustrated as separate and outside of the data storage service and the on-demand code execution system 620, in some embodiments the cache service 670 may be implemented within one or both of the data storage service 660 or on-demand code execution system 620 (e.g., on physical or logical commuting systems that are part of the data storage service 660 or on-demand code execution system 620).

The client devices 602, data storage service 660, and on-demand code execution system 620 may communicate via a network 604, which may include any wired network, wireless network, or combination thereof. For example, the network 604 may be a personal area network, local area network, wide area network, over-the-air broadcast network (e.g., for radio or television), cable network, satellite network, cellular telephone network, or combination thereof. As a further example, the network 604 may be a publicly accessible network of linked networks, possibly operated by various distinct parties, such as the Internet. In some embodiments, the network 604 may be a private or semi-private network, such as a corporate or university intranet. The network 604 may include one or more wireless networks, such as a Global System for Mobile Communications (GSM) network, a Code Division Multiple Access (CDMA) network, a Long Term Evolution (LTE) network, or any other type of wireless network. The network 604 can use protocols and components for communicating via the Internet or any of the other aforementioned types of networks. For example, the protocols used by the network 604 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The system 620 includes one or more frontends 630 which enable interaction with the on-demand code execution system 620. In an illustrative embodiment, the frontends 630 serve as a "front door" to the other services provided by the on-demand code execution system 620, enabling users (via client devices 602) to provide, request execution of, and view results of computer executable code. The frontends 630 include a variety of components to enable interaction between the on-demand code execution system 620 and other computing devices. For example, each frontend 630 may include a request interface providing client devices 602 with the ability to upload or otherwise communicate user-specified code to the on-demand code execution system 620 and to thereafter request execution of that code. In one embodiment, the request interface communicates with external computing devices (e.g., client devices 602, frontend 662, etc.) via a graphical user interface (GUI), CLI, or API. The frontends 630 process the requests and make sure that the requests are properly authorized. For example, the frontends 630 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," "function code," and "program code," may be used interchangeably. Such user code may be executed to achieve a specific function, for example, in connection with a particular data transformation developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, or Ruby (or another programming language).

To manage requests for code execution, the frontend 630 can include an execution queue, which can maintain a record of requested task executions. Illustratively, the number of simultaneous task executions by the on-demand code execution system 620 is limited, and as such, new task executions initiated at the on-demand code execution system 620 (e.g., via an API call, via a call from an executed or executing task, etc.) may be placed on the execution queue and processed, e.g., in a first-in-first-out order. In some embodiments, the on-demand code execution system 620 may include multiple execution queues, such as individual execution queues for each user account. For example, users of the service provider system 610 may desire to limit the rate of task executions on the on-demand code execution system 620 (e.g., for cost reasons). Thus, the on-demand code execution system 620 may utilize an account-specific execution queue to throttle the rate of simultaneous task executions by a specific user account. In some instances, the on-demand code execution system 620 may prioritize task executions, such that task executions of specific accounts or of specified priorities bypass or are prioritized within the execution queue. In other instances, the on-demand code execution system 620 may execute tasks immediately or substantially immediately after receiving a call for that task, and thus, the execution queue may be omitted.

The frontend 630 can further include an output interface configured to output information regarding the execution of tasks on the on-demand code execution system 620. Illustratively, the output interface may transmit data regarding task executions (e.g., results of a task, errors related to the task execution, or details of the task execution, such as total time required to complete the execution, total data processed via the execution, etc.) to the client devices 602 or the data storage service 660.

In some embodiments, the on-demand code execution system 620 may include multiple frontends 630. In such embodiments, a load balancer may be provided to distribute the incoming calls to the multiple frontends 630, for example, in a round-robin fashion. In some embodiments, the manner in which the load balancer distributes incoming calls to the multiple frontends 630 may be based on the location or state of other components of the on-demand code execution system 620. For example, a load balancer may distribute calls to a geographically nearby frontend 630, or to a frontend with capacity to service the call. In instances where each frontend 630 corresponds to an individual instance of another component of the on-demand code execution system 620, such as the active pool 648 described below, the load balancer may distribute calls according to the capacities or loads on those other components. Calls may in some instances be distributed between frontends 630 deterministically, such that a given call to execute a task will always (or almost always) be routed to the same frontend 630. This may, for example, assist in maintaining an accurate execution record for a task, to ensure that the task executes only a desired number of times. For example, calls may be distributed to load balance between frontends 630. Other distribution techniques, such as anycast routing, will be apparent to those of skill in the art.

The on-demand code execution system 620 further includes one or more worker managers 640 that manage the virtual execution environments, such as virtual machine instances 650 (shown as VM instance 650A and 650B, generally referred to as a "VM"), used for servicing incoming calls to execute tasks. While the following will be described with reference to virtual machine instances 650 as examples of such environments, embodiments of the present disclosure may utilize other environments, such as software containers. In the example illustrated in FIG. 6, each worker manager 640 manages an active pool 648, which is a group (sometimes referred to as a pool) of virtual machine instances 650 executing on one or more physical host computing devices that are initialized to execute a given task (e.g., by having the code of the task and any dependency data objects loaded into the instance).

Although the virtual machine instances 650 are described generally above as being assigned to a particular task, in some embodiments, the instances may be assigned to a group of tasks, such that the instance is tied to the group of tasks and any tasks of the group can be executed within the instance. For example, the tasks in the same group may belong to the same application, and each task (or subset of application tasks) may be implemented in a different container or other VCC. A task may be associated with permissions encompassing a variety of aspects controlling how a task may execute. For example, permissions of a task may define what network connections (if any) can be initiated by an execution environment of the task. As another example, permissions of a task may define what authentication information is passed to a task, controlling what network-accessible resources are accessible to execution of a task (e.g., objects on the service 660). As described in greater detail above, each task or computing service of the application may be provided a differently-scoped access credential to provide permissions for performing the subset of application functionality provided by each computing service.

Once a triggering event to execute an application or individual task has been successfully processed by a frontend 630, the frontend 630 passes a request to a worker manager 640 to execute the application or individual task. In one embodiment, each frontend 630 may be associated with a corresponding worker manager 640 (e.g., a worker manager 640 co-located or geographically nearby to the frontend 630) and thus, the frontend 630 may pass most or all requests to that worker manager 640. In another embodiment, a frontend 630 may include a location selector configured to determine a worker manager 640 to which to pass the execution request. In one embodiment, the location selector may determine the worker manager 640 to receive a call based on hashing the call, and distributing the call to a worker manager 640 selected based on the hashed value (e.g., via a hash ring). Various other mechanisms for distributing calls between worker managers 640 will be apparent to one of skill in the art.

Thereafter, the worker manager 640 may modify a virtual machine instance 650 (if necessary) and execute the code of the task within the instance 650. As shown in FIG. 6, respective instances 650 may have operating systems (OS) 652 (shown as OS 652A and 652B), language runtimes 654 (shown as runtime 654A and 654B), and user code 656 (shown as user code 656A and 656B). The OS 652, runtime 654, and user code 656 may collectively enable execution of the user code to implement the task. Thus, via operation of the on-demand code execution system 620, tasks may be rapidly executed within an execution environment.

In one embodiment, each VM 650 additionally includes staging code 657 executable to facilitate staging of input data on the VM 650 and handling of output data written on the VM 650, as well as a VM data store 658 accessible through a local file system of the VM 650. Illustratively, the staging code 657 represents a process executing on the VM 650 (or potentially a host device of the VM 650) and configured to obtain data from the data storage service 660 or cache service 670 and place that data into the VM data store 658. The staging code 657 can further be configured to obtain data written to a file within the VM data store 658, and to transmit that data to the data storage service 660 or cache service 670. Because such data is available at the VM data store 658, user code 656 is not required to obtain data over a network, simplifying user code 656 and enabling further restriction of network communications by the user code 656, thus increasing security. Rather, as discussed above, user code 656 may interact with input data and output data as files on the VM data store 658, by use of file handles passed to the code 656 during an execution. In some embodiments, input and output data may be stored as files within a kernel-space file system of the data store 658. In other instances, the staging code 657 may provide a virtual file system, such as a filesystem in userspace (FUSE) interface, which provides an isolated file system accessible to the user code 656, such that the user code's access to the VM data store 658 is restricted.

As used herein, the term "local file system" generally refers to a file system as maintained within an execution environment, such that software executing within the environment can access data as file, rather than via a network connection. In accordance with aspects of the present disclosure, the data storage accessible via a local file system may itself be local (e.g., local physical storage), or may be remote (e.g., accessed via a network protocol, like NFS, or represented as a virtualized block device provided by a network-accessible service). Thus, the term "local file system" is intended to describe a mechanism for software to access data, rather than physical location of the data.

The VM data store 658 can include any persistent or non-persistent data storage device. In one embodiment, the VM data store 658 is physical storage of the host device, or a virtual disk drive hosted on physical storage of the host device. In another embodiment, the VM data store 658 is represented as local storage, but is in fact a virtualized storage device provided by a network accessible service. For example, the VM data store 658 may be a virtualized disk drive provided by a network-accessible block storage service. In some embodiments, the data storage service 660 may be configured to provide file-level access to objects stored on the data stores 668, thus enabling the VM data store 658 to be virtualized based on communications between the staging code 657 and the service 660. For example, the data storage service 660 can include a file-level interface providing network access to objects within the data stores 668 as files. The file-level interface may, for example, represent a network-based file system server (e.g., a network file system (NFS)) providing access to objects as files, and the staging code 657 may implement a client of that server, thus providing file-level access to objects of the service 660.

In some instances, the VM data store 658 may represent virtualized access to another data store executing on the same host device of a VM instance 650. For example, an active pool 648 may include one or more data staging VM instances (not shown in FIG. 6), which may be co-tenanted with VM instances 650 on the same host device. A data staging VM instance may be configured to support retrieval and storage of data from the service 660 (e.g., data objects or portions thereof, input data passed by client devices 602, etc.), and storage of that data on a data store of the data staging VM instance. The data staging VM instance may, for example, be designated as unavailable to support execution of user code 656, and thus be associated with elevated permissions relative to instances 650 supporting execution of user code. The data staging VM instance may make this data accessible to other VM instances 650 within its host device (or, potentially, on nearby host devices), such as by use of a network-based file protocol, like NFS. Other VM instances 650 may then act as clients to the data staging VM instance, enabling creation of virtualized VM data stores 658 that, from the point of view of user code 656A, appear as local data stores. Beneficially, network-based access to data stored at a data staging VM can be expected to occur very quickly, given the co-location of a data staging VM and a VM instance 650 within a host device or on nearby host devices.

While some examples are provided herein with respect to use of IO stream handles to read from or write to a VM data store 658, IO streams may additionally be used to read from or write to other interfaces of a VM instance 650 (while still removing a need for user code 656 to conduct operations other than stream-level operations, such as creating network connections). For example, staging code 657 may "pipe" input data to an execution of user code 656 as an input stream, the output of which may be "piped" to the staging code 657 as an output stream. As another example, a staging VM instance or a hypervisor to a VM instance 650 may pass input data to a network port of the VM instance 650, which may be read-from by staging code 657 and passed as an input stream to the user code 657. Similarly, data written to an output stream by the task code 656 may be written to a second network port of the instance 650A for retrieval by the staging VM instance or hypervisor. In yet another example, a hypervisor to the instance 650 may pass input data as data written to a virtualized hardware input device (e.g., a keyboard) and staging code 657 may pass to the user code 656 a handle to the IO stream corresponding to that input device. The hypervisor may similarly pass to the user code 656 a handle for an IO stream corresponding to an virtualized hardware output device, and read data written to that stream as output data. Thus, the examples provided herein with respect to file streams may generally be modified to relate to any IO stream.

The data storage service 660, cache service 670, and on-demand code execution system 620 are depicted in FIG. 6 as operating in a distributed computing environment including several computer systems that are interconnected using one or more computer networks (not shown in FIG. 6). The data storage service 660, cache service 670, and on-demand code execution system 620 could also operate within a computing environment having a fewer or greater number of devices than are illustrated in FIG. 6. Thus, the depiction of the data storage service 660, cache service 670, and on-demand code execution system 620 in FIG. 6 should be taken as illustrative and not limiting to the present disclosure. For example, the on-demand code execution system 620 or various constituents thereof could implement various web services components, hosted or "cloud" computing environments, or peer to peer network configurations to implement at least a portion of the processes described herein. In some instances, the data storage service 660, cache service 670, and on-demand code execution system 620 may be combined into a single service. Further, the data storage service 660, cache service 670, and on-demand code execution system 620 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 6, the data storage service 660, cache service 670, and on-demand code execution system 620 are illustrated as connected to the network 604. In some embodiments, any of the components within the data storage service 660, cache service 670, and on-demand code execution system 620 can communicate with other components of the on-demand code execution system 620 via the network 604. In other embodiments, not all components of the data storage service 660, cache service 670, and on-demand code execution system 620 are capable of communicating with other components of the virtual environment 600. In one example, only the frontends 630 and 662 (which may in some instances represent multiple frontends) of the on-demand code execution system 620 and the data storage service 660, respectively, may be connected to the network 604, and other components of the data storage service 660 and on-demand code execution system 620 may communicate with other components of the environment 600 via the respective frontends 630 and 662.

While some functionalities are generally described herein with reference to an individual component of the data storage service 660, cache service 670, and on-demand code execution system 620, other components or a combination of components may additionally or alternatively implement such functionalities. Thus, the specific configuration of elements within FIG. 6 is intended to be illustrative.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
 a credential vending service comprising one or more computing device configured to obtain access credentials for use by service virtual computing components; and
 an on-demand code execution service comprising a plurality of host computing devices, wherein the on-demand code execution service is configured to provide on-demand execution of function code, and wherein a host computing device of the plurality of host computing devices is configured to:
  receive an instruction to launch a service virtual computing component configured to provide one or more computing services to an application virtual computing component and a system computing component, wherein the application virtual computing component is to perform application functionality, and wherein the system computing component is to perform system functionality including management of the application virtual computing component;
  determine, based on configuration data, the service virtual computing component is to execute using a first access credential to provide a first computing service to the application virtual computing component, and the service virtual computing component is to execute using a second access credential to provide a second computing service to the system computing component, wherein the first access credential is assigned a different set of computing resource access permissions than the second access credential;
  obtain the first access credential and the second access credential from the credential vending service; and
  initiate execution of the service virtual computing component using the first access credential and the second access credential, wherein the credential vending service is configured to:

receive, from the host computing device, a request for the first access credential, wherein the request is associated with an access role to which the first access credential is assigned;

retrieve the first access credential from an authentication and authorization service based at least partly on the credential vending service assuming the access role; and send the first access credential to the host computing device.

2. The system of claim 1, wherein initiating execution of the service virtual computing component comprises executing the service virtual computing component in a same virtual machine as the application virtual computing component and the system computing component.

3. The system of claim 1, wherein initiating execution of the service virtual computing component comprises execution of at least of: a logging service, an execution trace service, or a network configuration service.

4. The system of claim 1, wherein the host computing device of the plurality of host computing devices is further configured to:

obtain a first image to be used to launch the service virtual computing component; and obtain a second image to be used to launch the application virtual computing component, wherein the second image is different from the first image.

5. A computer-implemented method comprising:

under control of a computing system comprising one or more computing devices configured to execute specific instructions:

determining to launch, on the computing system, a service virtual computing component configured to provide one or more computing services to an application virtual computing component and a system computing component, wherein the application virtual computing component is to perform application functionality, and wherein the system computing component is to perform system functionality including management of the application virtual computing component;

determining the service virtual computing component is to execute using a first access credential to provide a first computing service to the application virtual computing component, and the service virtual computing component is to execute using a second access credential to provide a second computing service to the system computing component, wherein the first access credential is assigned a different set of computing resource access permissions than the second access credential;

obtaining the first access credential and the second access credential; and initiating execution of the service virtual computing component using the first access credential and the second access credential.

6. The computer-implemented method of claim 5, wherein initiating execution of the service virtual computing component comprises executing the service virtual computing component in a same virtual machine as the application virtual computing component and the system computing component.

7. The computer-implemented method of claim 5, wherein initiating execution of the service virtual computing component comprises executing a first container separate from a second container executing the application virtual computing component.

8. The computer-implemented method of claim 5, further comprising obtaining application configuration data specifying a plurality of computing services to be provided to the application virtual computing component, wherein for each computing service of the plurality of computing services, the application configuration data specifies a corresponding access credential to be used.

9. The computer-implemented method of claim 5, further comprising:

obtaining a first image to be used to launch the service virtual computing component; and obtaining a second image to be used to launch the application virtual computing component, wherein the second image is different from the first image.

10. The computer-implemented method of claim 5, wherein initiating execution of the service virtual computing component comprises execution of at least of: a logging service, an execution trace service, or a network configuration service.

11. The computer-implemented method of claim 5, further comprising determining to launch, on the computing system, a second service virtual computing component configured to provide a second set of one or more computing services to the application virtual computing component different from the one or more computing services the service virtual computing component is configured to provide.

12. The computer-implemented method of claim 5, wherein obtaining the first access credential comprises:

sending, to a credential vending service, a request for the first access credential, wherein the credential vending service assumes a role associated with the first access credential to obtain the first access credential from an authentication and authorization service; and receiving, from the credential vending service, the first access credential in response to the request.

13. The computer-implemented method of claim 5, wherein obtaining the first access credential comprises obtaining an access key secret and a session token, wherein the access key secret and the session token are used to access a computing resource in connection with operation of the service virtual computing component.

14. A system comprising:

computer-readable memory storing executable instructions; and one or more computer processors programmed by the executable instructions to at least:

determine to launch a service virtual computing component configured to provide one or more computing services to an application virtual computing component and a system computing component, wherein the application virtual computing component is to perform application functionality, and wherein the system computing component is to perform system functionality including management of the application virtual computing component;

determine the service virtual computing component is to execute using a first access credential to provide a first computing service to the application virtual computing component, and the service virtual computing component is to execute using a second access credential to provide a second computing service to the system computing component, wherein the first access credential is assigned a different set of computing resource access permissions than the second access credential;

obtain the first access credential and the second access credential; and initiate execution of the service virtual computing component using the first access credential and the second access credential.

15. The system of claim 14, wherein to initiate execution of the service virtual computing component, the one or more computer processors are further configured by the executable instructions to execute the service virtual computing component in a same virtual machine as the application virtual computing component and the system computing component.

16. The system of claim 14, wherein to initiate execution of the service virtual computing component, the one or more computer processors are further configured to execute a first container separate from a second container executing the application virtual computing component.

17. The system of claim 14, wherein the one or more computer processors are further configured to obtain application configuration data specifying a plurality of computing services to be provided to the application virtual computing component, wherein for each computing service of the plurality of computing services, the application configuration data specifies a corresponding access credential to be used.

18. The system of claim 14, wherein the one or more computer processors are further configured to:
    obtain a first image to be used to launch the service virtual computing component; and
    obtain a second image to be used to launch the application virtual computing component, wherein the second image is different from the first image.

19. The system of claim 14, wherein to initiate execution of the service virtual computing component, the one or more computer processors are further configured to execute at least one of: a logging service, an execution trace service, or a network configuration service.

20. The system of claim 14, wherein the one or more computer processors are further configured to determine to launch a second service virtual computing component configured to provide a second set of one or more computing services to the application virtual computing component different from the one or more computing services the service virtual computing component is configured to provide.

* * * * *